(12) United States Patent
Herres

(10) Patent No.: US 7,176,404 B2
(45) Date of Patent: Feb. 13, 2007

(54) SYSTEM FOR QUICK DISCONNECT OF TORCH FROM POWER AND GAS SUPPLY UNIT

(75) Inventor: Kenneth F. Herres, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 645 days.

(21) Appl. No.: 10/348,733

(22) Filed: Jan. 22, 2003

(65) Prior Publication Data
US 2004/0140295 A1    Jul. 22, 2004

(51) Int. Cl.
*B23K 10/00* (2006.01)
(52) U.S. Cl. ............... 219/121.5; 219/121.54; 219/121.59; 219/121.48; 219/137.63; 219/136
(58) Field of Classification Search ........... 219/121.59, 219/121.39, 136, 137.63, 75, 74, 121.48, 219/121.54, 121.36, 121.5
See application file for complete search history.

(56) References Cited

U.S. PATENT DOCUMENTS

| | | | |
|---|---|---|---|
| 4,864,099 A * | 9/1989 | Cusick et al. ........ | 219/137.62 |
| 5,074,802 A | 12/1991 | Gratziani et al. ........ | 439/192 |
| 5,571,427 A * | 11/1996 | Dimock et al. ........ | 219/75 |
| 6,066,832 A * | 5/2000 | Uecker et al. ........ | 219/136 |
| 6,472,631 B1 | 10/2002 | Eickhoff et al. ........ | 219/121.39 |
| 6,713,711 B2 | 3/2004 | Conway et al. ........ | 219/121.48 |
| 2004/0089639 A1* | 5/2004 | Raymond et al. ........ | 219/121.48 |

* cited by examiner

*Primary Examiner*—Mark Paschall
(74) *Attorney, Agent, or Firm*—Ostrager, Chong, Flaherty & Broitman P.C.

(57) ABSTRACT

A torch cable in which both the electrical connection and the pneumatic connection can be made concurrently in one motion by coupling the end of the torch cable to the exterior of the supply unit. The coupling further includes a quick disconnect feature. The torch cable coupling is simple and inexpensive, using standard off-the-shelf components. The end of the cable comprises various components that are overmolded to form an electrically insulative body, e.g., made of urethane rubber compound. This molded body incorporates strain relief, is water resistant, protects the electrical plug, and stabilizes the electrical contacts. Gas, power and control are combined in one assembly. The pneumatic quick disconnect coupling is used as a latching mechanism for the entire assembly. The torch cable can be disconnected from the supply unit by simply releasing the quick disconnect coupling and then pulling the end of the torch cable away from the supply unit. The pneumatic connector and the electrical plug form keying means by their orientation.

31 Claims, 11 Drawing Sheets

SYSTEM FOR QUICK DISCONNECT OF TORCH FROM POWER AND GAS SUPPLY UNIT

BACKGROUND OF THE INVENTION

This invention generally relates to welding or heating systems. In particular, the invention relates to plasma arc cutting units.

Plasma arc cutting is a process in which an electric arc is used to cut a metallic workpiece. Generally, plasma arc cutting uses an electric arc between an electrode and the metal to be cut. The arc creates a plasma that cuts the metallic workpiece. Plasma cutters are often used in applications such as building maintenance (structural or HVAC) where they are carried from job to job, and thus are preferably highly portable.

A typical prior art plasma arc cutter includes a. power supply, an air supply and a plasma torch. A plasma torch is used to create and maintain the arc and the plasma jet that perform the cutting. A plasma cutting power supply receives an input voltage (from a power line or generator) and provides an output voltage to a pair of output terminals, one of which is the electrode and the other of which is connected to the workpiece. There are numerous types of known plasma arc cutting power supplies, such as magnetic power supplies, inverter power supplies, phase control power supplies, and choppers or secondary switchers. A typical plasma cutting power supply includes one or more of each of the following: input power lines, transformers, converters/inverters, output power lines, and controllers, which cooperate to provide power to the electrode for maintaining the arc.

An air supply is used with most plasma cutters to help start the arc, control the torch, and cool the torch. For example, U.S. Pat. No. 4,791,268 to Sanders et al. describes a plasma torch controlled with air. A movable electrode is the cathode and a fixed nozzle is the anode. A pilot current is provided to the cathode and anode, which are forced into contact by a spring. After electrical current begins to flow from the electrode to the nozzle, gas or air supplied to the torch counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created.

The plasma jet causes the arc to transfer (at least in part) to the work piece, thus initiating cutting. Electronics in the power source sense when the arc has transferred and then supply a main cutting current of greater amperage after the transfer has occurred. Also, the torch tip is disconnected (electrically), interrupting the pilot current path. Thus, the current is used to cut the workpiece, and follows a path including the positive terminal, the workpiece and the electrode.

Plasma arc torches are widely used in the cutting or marking of metallic materials. A plasma torch generally includes an electrode and a nozzle having a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a gas with high temperature and high momentum. Gases used in the torch can be non-reactive (e.g. argon or nitrogen), or reactive (e.g. oxygen or air).

One known configuration of a plasma arc torch includes one or more cables connecting the torch to the power supply to provide the torch with electrical current and gas. The connection of the cable(s) to the power supply must be rugged to handle the strain placed on the cable as it is manipulated in order to place the plasma arc torch in a suitable position to cut or mark a workpiece.

The cable(s) used to connect the torch to the power supply can be a single integral cable having a gas hose located in the middle of the cable and electrical conductors and fillers arranged symmetrically around the gas hose. A jacket material is extruded over the gas hose, electrical conductors and fillers. A strain relief mechanism can be attached to the jacket to handle loads applied to the cable. The jacket, gas hose, electrical conductors and fillers are anchored together over a barb-type fitting. A clamp, which acts as the strain relief mechanism, is applied to grab and hold the jacket to prevent relative axial motion (or twisting) of the cable components. The stress through the cable is absorbed by the clamp and transferred to the chassis of the power supply through a mechanical connection.

Cables with a clamp designed to prevent axial motion or twisting of cable components are disclosed in the prior art. The cable used in one plasma arc torch system is connected to the power supply by a threaded quick disconnect connector. A quick disconnect connector is advantageous in that it simplifies torch removal but is expensive to make. In another example of an integral cable with a clamp for preventing axial motion (or twisting) of cable components, stress is absorbed by the chassis of the power supply through a tool-tightened nut. A tool-tightened nut is advantageous in that it is inexpensive.

U.S. Pat. No. 6,4120,631, assigned to Hypertherm, Inc., discloses a plasma arc torch for piercing or cutting a workpiece. The plasma arc torch system includes a torch body, a power supply and a cable with two ends. One end of the cable is connected to the torch body, while the other end of the cable is attached to a strain relief system to couple the cable to the power supply. The strain relief system includes a positive axial restraint component for restraining axial movement of the cable relative to the power supply and a positive rotational restraint component for restraining rotational movement of the cable relative to the power supply. The positive axial and rotational restraint components are independent components arranged in a spaced relationship to each other. In one embodiment, the positive axial restraint component comprises a quick disconnect pneumatic connection attached to the cable and a quick disconnect pneumatic connection receptacle (which receives the pneumatic connection and itself is coupled to a supply of gas or air) positioned inside the power supply housing. The positive rotational restraint component comprises a shaped boot attached to the torch cable and a mating receptacle formed in the power supply housing. The shaped boot and the mating receptacle are designed to prevent rotation of the torch cable when the shaped boot is inserted in the mating receptacle. The electrical connection between the torch cable and the supply unit is independent of the quick disconnect pneumatic connection. Both the electrical connection and the quick disconnect pneumatic connection are located inside the housing.

There is a need for a torch cable in which both the electrical connection and the pneumatic connection can be made concurrently in one motion by coupling the end of the torch cable to the exterior of the supply unit. As used herein, the term "torch cable" includes both a cable having one end plugged directly into a supply unit and having a torch connected at the other end as well as a cable having one end connected to the supply unit via one or more extension cables and having a torch connected to its other end. In the latter case, the cable carrying the torch and the one or more extension cables, when connected in series, form a "torch cable".

BRIEF DESCRIPTION OF THE INVENTION

The invention is directed to a torch cable in which both the electrical connection and the pneumatic connection can be made concurrently in one motion by coupling the end of the torch cable to the exterior of the supply unit. The coupling further includes a quick disconnect feature. The torch cable coupling is simple and inexpensive, using standard off-the-shelf components. The end of the cable comprises various components that are overmolded to form an electrically insulative body, e.g., made of urethane rubber compound. This molded body incorporates strain relief, is water resistant, protects the electrical plug, and stabilizes the electrical contacts. The invention allows gas, power and control to be combined in one assembly. In one embodiment of the invention, the pneumatic quick disconnect coupling is used as a latching mechanism for the entire assembly. The torch cable can be disconnected from the supply unit by simply releasing the quick disconnect coupling and then pulling the end of the torch cable away from the supply unit. The pneumatic connector and the electrical plug form keying means by their orientation. The pneumatic connector on the supply unit can be either self-closing or straight through when the torch cable is uncoupled.

One aspect of the invention is a torch assembly comprising a torch cable and a torch coupled to one end of the torch cable, the torch comprising an electrode, and the torch cable comprising: a fitting having a passageway; a hose having a passageway for guiding gas from the passageway of the fitting to the torch; a plurality of insulated wires adjacent and external to the hose, at least some of the wires being electrically coupled to the electrode of the torch; a plurality of electrical connectors respectively electrically coupled to the wires; an electrically insulative support structure that supports the plurality of electrical connectors in a spaced and individually electrically isolated relationship; a sheath surrounding the hose along at least a portion of the hose's length, the insulated wires passing between the hose and the sheath; and an electrically insulative body proximal to the other end of the torch cable. The body holds the support structure and the fitting in a fixed spatial relationship.

Another aspect of the invention is a system for coupling one end of a torch cable to a supply unit that supplies both power and pressurized gas, the torch cable in turn carrying power and pressurized gas from the supply unit to a torch coupled to the other end of the torch cable. One end of the torch cable comprises first pneumatic connection means and first electrical connection means, while the supply unit comprises second pneumatic connection means designed to couple with the first pneumatic connection means, second electrical connection means designed to couple with the first electrical connection means, and a panel to which the second pneumatic connection means and the second electrical connection means are mounted. The one end of the torch cable further comprises a molded body of electrically insulative material in which respective portions of the first pneumatic connection means and the first electrical connection means are embedded and held in a fixed spatial relationship with mutually parallel axes. This parallelism allows the first pneumatic connection means and the first electrical connection means to be respectively coupled to the second pneumatic connection means and the second electrical connection means during the same movement of the molded body toward the panel.

A further aspect of the invention is a system for coupling one end of a torch cable to a supply unit that supplies both power and pressurized gas, the torch cable in turn carrying power and pressurized gas from the supply unit to a torch coupled to the other end of the torch cable. One end of the torch cable comprises a body of electrically insulative material, a fitting having a passageway and an outer periphery surrounded by a first portion of the body, a first coupling element having one end coupled to the fitting and having a passageway in fluid communication with the passageway of the fitting, and an electrical plug having an outer periphery surrounded by a second portion of the body. The supply unit comprises a panel, a second coupling element mounted to the panel that couples with the first coupling element, and an electrical socket mounted to the panel that receives the electrical plug. The body supports the fitting and the electrical plug in a fixed spatial relationship that allows the first and second coupled elements to be coupled to each other and the electrical plug to be plugged into the electrical socket during the same movement of the body toward the panel.

Yet another aspect of the invention is a system for coupling one end of a torch cable to a supply unit that supplies both power and pressurized gas, the torch cable in turn carrying power and pressurized gas from the supply unit to a torch coupled to the other end of the torch cable. One end of the torch cable comprises a body of electrically insulative material, a fitting having a passageway and an outer periphery surrounded by a first portion of the body, a first coupling element having one end coupled to the fitting and having a passageway in fluid communication with the passageway of the fitting, and an electrical socket having an outer periphery surrounded by a second portion of the body. The supply unit comprises a panel, a second coupling element mounted to the panel that couples with the first coupling element, and an electrical plug mounted to the panel that is received by the electrical socket. The body supports the fitting and the electrical plug in a fixed spatial relationship that allows the first and second coupled elements to be coupled to each other and the electrical plug to be plugged into the electrical socket during the same movement of the body toward the panel.

A further aspect of the invention is a torch assembly comprising a torch cable and a torch coupled to one end of the torch cable, the torch comprising an electrode, and the torch cable comprising: a fitting having a passageway; a hose having a passageway for guiding gas from the passageway of the fitting to the torch; a plurality of insulated wires adjacent and external to the hose, at least one of the wires being electrically coupled to the electrode of the torch; a plurality of electrical connectors respectively electrically coupled to the wires; an electrically insulative frame having a plurality of cavities in which the electrical connectors are respectively inserted in mutually spaced and electrically isolated relationship; a body in which the fitting, the frame and portions of the insulated wires are embedded and restrained from relative movement; and a sheath surrounding the hose along at least a portion of the hose's length, the insulated wires passing between the hose and the sheath.

Another aspect of the invention is a method of quickly connecting the power and gas lines of a torch to a supply unit, comprising the following steps: manufacturing a torch cable in which the power and gas lines are inside a sheath, and a first power coupling element connected to the power line and a first gas coupling element connected to the gas line are spaced apart from each other by a predetermined distance and have parallel axes; manufacturing a panel of the supply unit so that a second power coupling element in electrical communication with a power supply and a second gas coupling element in fluid communication with a gas supply are spaced apart from each other by a predetermined distance and have parallel axes; and engaging the first power coupling element with the second power coupling element and the first gas coupling element with the second coupling element by a single continuous movement of the end of the torch cable toward the panel.

Yet another aspect of the invention is a system comprising: a torch cable comprising power and gas lines, a sheath surrounding respective portions of the power and gas lines, a first power coupling element connected to the power line, a first gas coupling element connected to the gas line, and means for supporting the first power coupling element and the first gas coupling element in a fixed spatial relationship spaced apart from each other by a predetermined distance; and a supply unit comprising a panel, a second power coupling element in electrical communication with a power supply and mounted to the panel, and a second gas coupling element in fluid communication with a gas supply, the second power coupling element and the second gas coupling element being in a fixed spatial relationship spaced apart from each other by the predetermined distance. The first and second power coupling elements and the first and second gas coupling elements are arranged so that the first power coupling element can be engaged with the second power coupling element and the first gas coupling element can be engaged with the second coupling element by a single continuous movement of the end of the torch cable toward the panel.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

The present invention is concerned with the coupling of a plasma arc cutting torch or an arc welding torch to a power supply unit and structures for accomplishing such coupling. The invention is not limited in any sense to a particular torch or to a particular power supply unit. For the sake of illustration, a known plasma arc cutting system will be described with reference to FIG. 1 and a known plasma arc torch will be described with reference to FIG. 2. However, it should be appreciated that the quick disconnect feature of the present invention can be used in other plasma arc cutting systems with other plasma arc torches as well as in arc welding systems.

Figure 1:
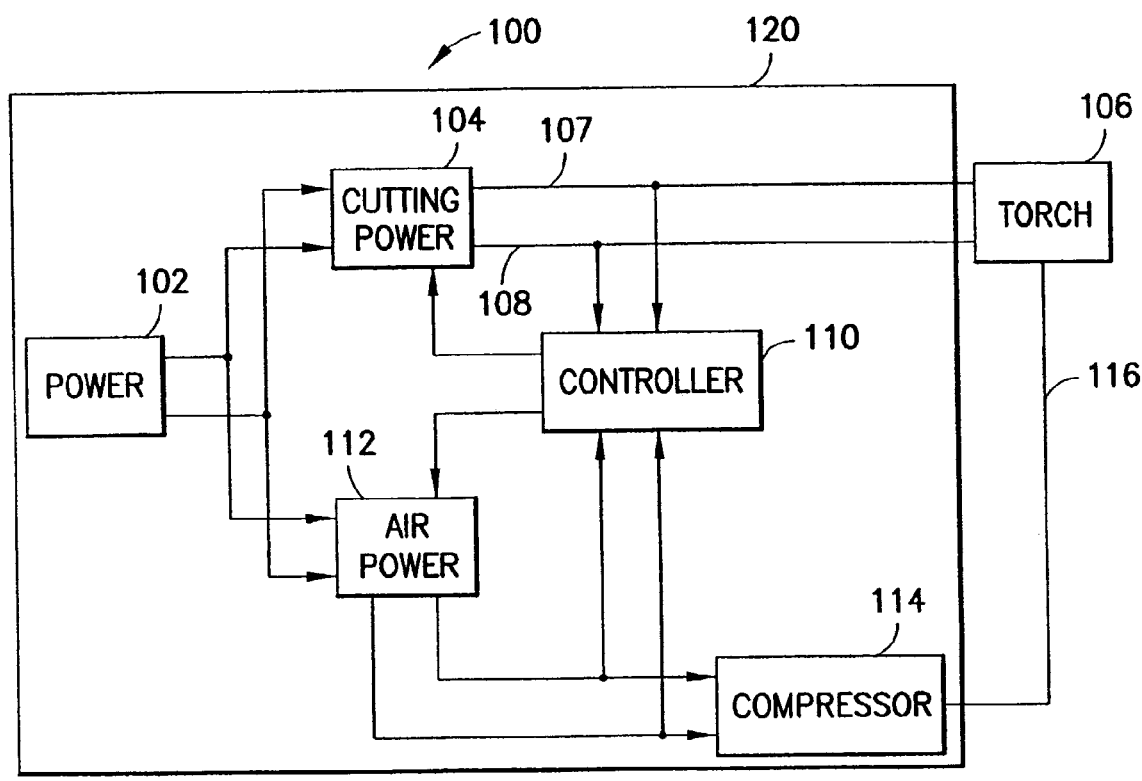
FIG. 1 is a block diagram representing a prior art plasma arc cutting system having an integral compressor.
Figure 2:
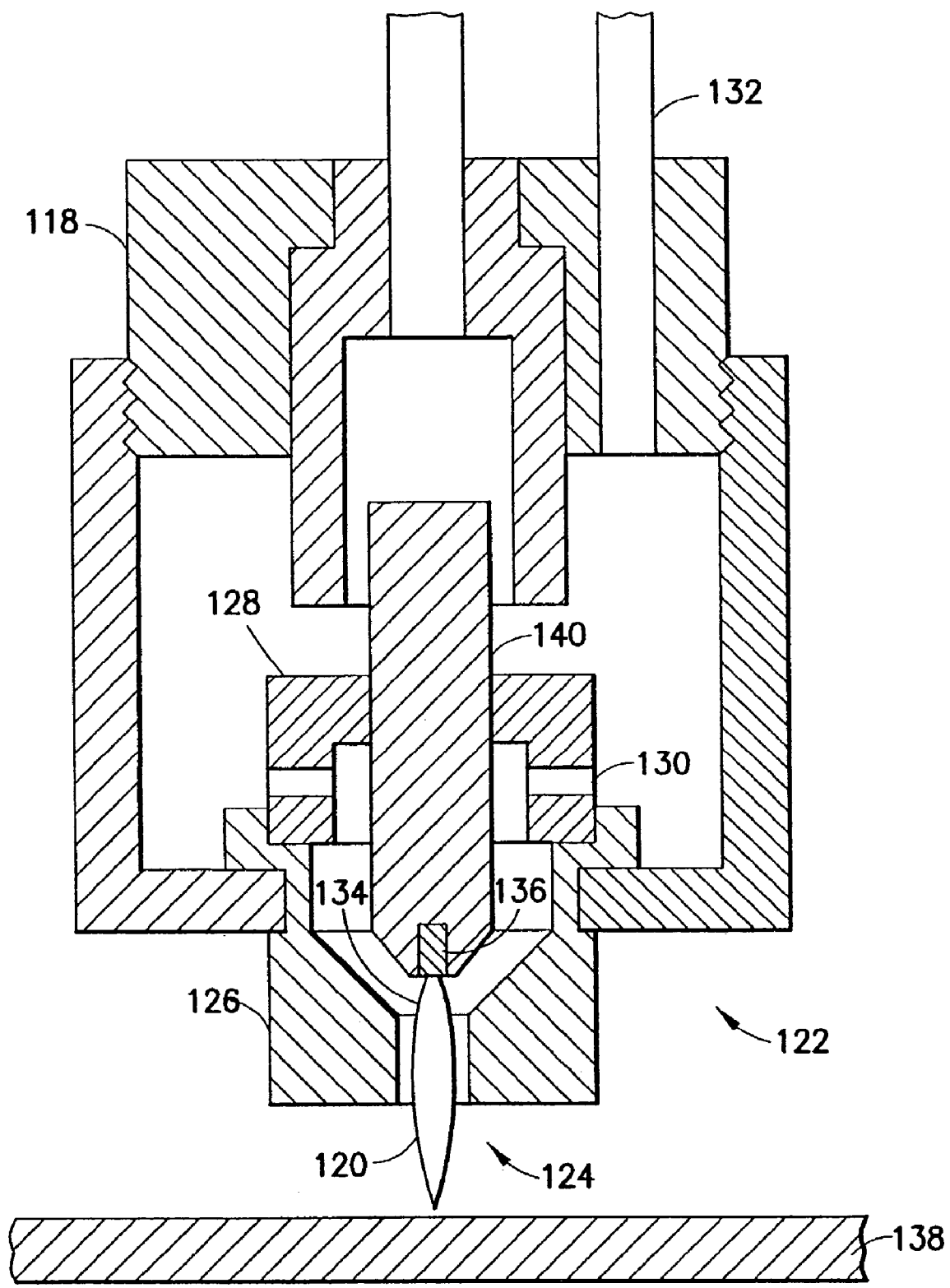
FIG. 2 is a drawing showing a cross-sectional view of a conventional plasma arc torch.

FIG. 1 (taken from U.S. Pat. No. 6,194,6130) shows a known plasma cutter 100 having an air compressor 114 disposed in a housing 120. Plasma cutter 100 includes a power source 102 that provides power to a cutting power supply 104 and air power supply 112. Power source 102 may include a transformer core and a primary winding shared by the compressor and cutter, with separate secondary windings.

Power source 102 may include, in alternative embodiments, a secondary winding that provides power to the compressor and cutter power circuit (using either the same or different secondary taps), or a shared transformer and rectifier, with power from the rectifier feeding (directly or indirectly) power to the cutting power circuit 104 and the compressor 114. Power source 102 may include, in another alternative embodiment, a separate transformer (core and windings), but a common connector to utility or engine power (such as a standard 110 Vac plug). The cutting power supply 104 provides cutting power on a pair of lines 107 and 108 to a plasma torch 106. Cutting power supply 104 is controlled by a controller 110. Feedback may be provided from cutting power supply 104 and/or output lines 107 and 108, and/or torch 106 to the controller 110. The feedback may be used to regulate the cutting power supply 104, and can include voltage, current, power, and functions thereof, a trigger signal (e.g., from torch 106), and user-selectable or fixed setpoints. The term "trigger signal" includes any signal from the user indicating an intention to cut or the completion of a cut, and can be from the torch or the control panel (not shown).

Air power supply 112 provides power to a compressor 114. Air power supply 112 is also controlled by controller 110, and common control signals and feedback signals are used to control air power supply 112 and cutting power supply 104: Compressor 114 provides air via an air hose 116 to the torch 106. Feedback may be provided from the output of the air power supply 112, or from within the air power supply 112, to controller 110 to control or regulate air power supply 112. Additionally, feedback signals from torch 106 (such as a trigger signal) and/or cutting power supply 104 may also be used to regulate air power supply 112.

Typically, the power supply provides continuously variable current output within a range, e.g., from about 20 to 40 amperes. This range can be lower or higher depending on the torch system, the thickness the workpiece and the desired cutting speeds. The variable power supply allows for wide variations in cutting speeds for a given thickness of metal.

A typical plasma arc torch comprises a torch body connected to the power supply by a cable. The power supply is enclosed by a housing. The cable is connected to the power supply by a strain relief system. The cable provides the torch body with a plasma gas from a gas source and electrical power from the power supply to ignite and sustain a plasma stream. In some embodiments, air is used as the plasma gas, but other gases can be used to improve cut quality on metals such as stainless steel and aluminum. A workpiece lead (not shown) provides a return path for the current generated by the power supply and is typically connected to a workpiece (not shown) by a clamp (not shown).

Figure 3:
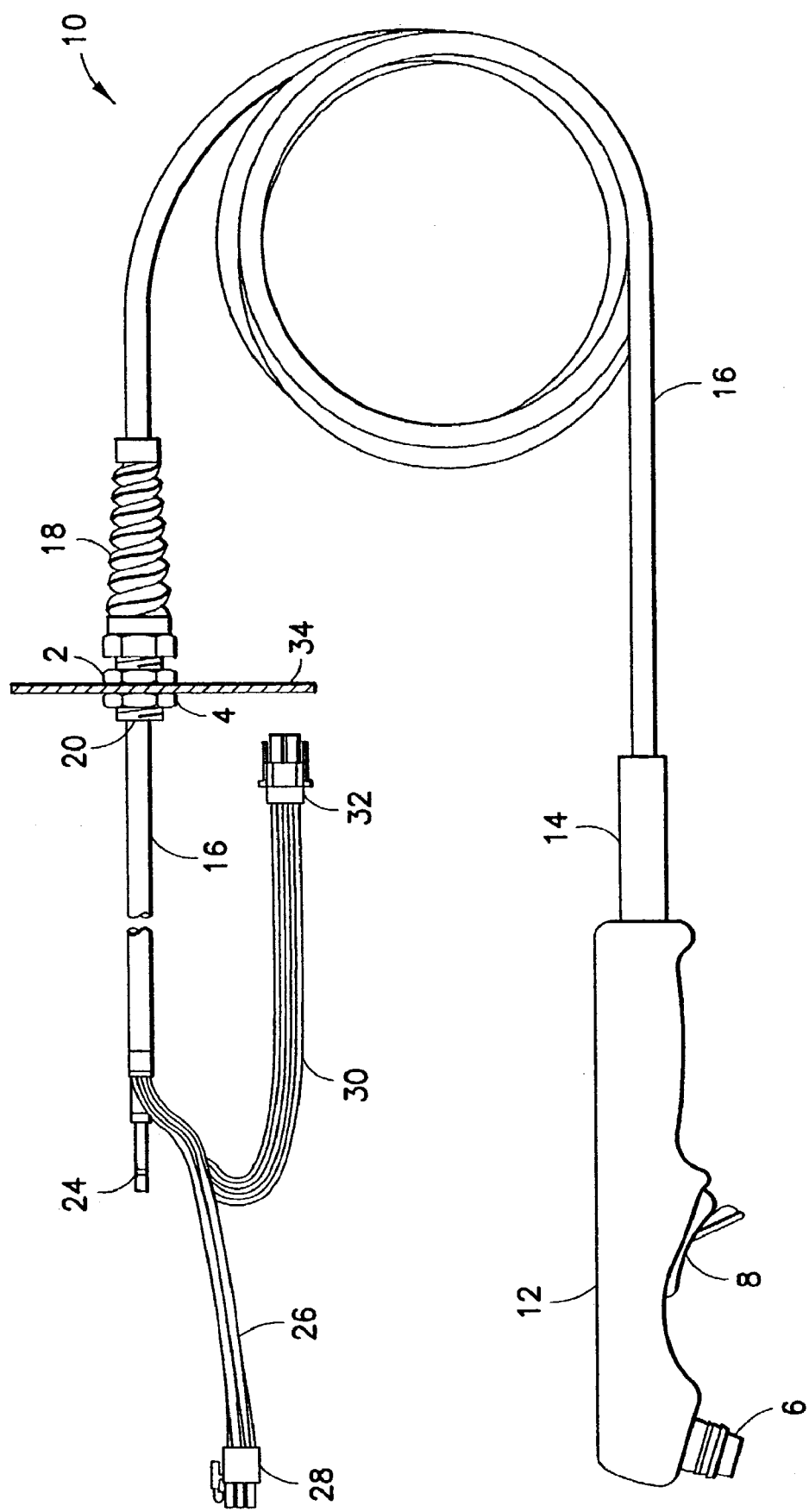
FIG. 3 is a drawing showing an isometric view of a prior art plasma arc torch mounted to a portion of the power supply housing or cover, indicated by hatching.

FIG. 3 (taken from U.S. Pat. No. 6,4120,631) illustrates in simplified schematic form a plasma arc torch representative of any of a variety of models of torches. The torch has a body 118 that is generally cylindrical with an exit orifice 120 at a lower end 122. A plasma arc 124, i.e., an ionized gas jet, passes through the exit orifice 120. The torch is used to pierce and cut metal, such as mild steel or other electrically conducting materials, in a transferred arc mode. In cutting mild steel, the torch operates with a reactive gas, such as oxygen or air, or a non-reactive gas, such as nitrogen or argon, as the plasma gas to form the transferred plasma arc.

The torch body 118 supports an electrode 92 having an insert 136 in its lower end and a nozzle 126 spaced from the electrode 92. The nozzle 126 has a central orifice that defines the exit orifice 120. A swirl ring 128 is mounted to the torch body 118. In one embodiment, the swirl ring 128 has a set of radially offset (or canted) gas distribution holes 130 that impart a tangential velocity component to the plasma gas flow causing it to swirl. This swirl creates a vortex that constricts the arc and stabilizes the position of the arc on the insert 136.

In operation, the plasma gas flows through a gas inlet tube 132 and the gas distribution holes 130. The gas flows into the plasma chamber 134 and out of the torch through the exit orifice 120. A pilot arc, which ionizes the gas passing through the exit orifice, is first generated between the electrode 136 and the nozzle 126. The arc then transfers from the nozzle to a workpiece 138. The particular construction details of the torch body, including the arrangement of components for directing gas flow and providing electrical connections, can take a wide variety of forms.

A commercially available plasma arc torch assembly 10 is shown in FIG. 3. The torch assembly 10 comprises a torch cable that penetrates an opening in a wall or panel 34 of the power supply housing and is fastened to that wall by means of a pair of nuts 2 and 4 coupled to a threaded section 20 on opposing sides of panel 34. A strain relief system 18 is integrally formed with the threaded section 20, the integrally formed part having a bore through which the torch cable passes. The outer sheath 16 of the cable is joined to one or both of sections 18 and 20. The outer sheath 16 is made of electrically insulative, flexible and water impermeable material. The outer sheath 16 surrounds a flexible air hose 22. The end of the air hose 22 receives a pneumatic connector 24 that couples to another connector (not shown) for supplying pressurized gas. Two sets of insulated wires pass through the annular space between the sheath 16 and hose 22. One set 26 of insulated wires terminate at electrical connectors in a plug 28 that will be plugged into a first receptacle (not shown) that communicates with a power circuit (such as power circuit 102 in FIG. 1) for providing power to the torch, while another set 30 of insulated wires terminate at electrical connectors in a plug 32 that will be plugged into a second receptacle (not shown) that communicates with a controller (such as controller 110 in FIG. 1).

The other end of the torch cable is connected to a torch 12 comprising an electrode (not shown in FIG. 3, but see FIG. 2), a nozzle 6, and a trigger 8. Another strain relief system 14 relieves strain in the area where the torch 12 meets the cable. The electrode inside the torch 12 receives power via insulated wires 26, while operation of the trigger 8 produces control signals that reach the controller via insulated wires 30.

When repairing or replacing the torch or the cable that couples the torch to the power supply, it is important that the cable can be quickly disconnected from the power supply. In addition, operators often wish to disconnect the torch from the power supply for convenience during storage or transport of the system. The torch cable shown in FIG. 3 requires three separate operations for disconnection, to wit, unplugging of power plug 28 from its receptacle; unplugging of control plug 32 from its receptacle; and unscrewing of nut 4 that fastens the torch cable assembly 10 to the wall or panel 34.

The present invention is directed to a torch cable assembly that can be disconnected in one simple operation. This is achieved by building the end of the torch cable so that the electrical and pneumatic connectors have a fixed spatial relationship and can be coupled to the supply unit simultaneously with one motion, as seen for example, in FIGS. 4 and 5. In this embodiment, a quick disconnect pneumatic connector or coupling element 42 is mounted to a wall or panel 40 of the supply unit. The end of pneumatic connector 42 located inside the supply unit is connected (by means not shown in FIG. 4) to a source of pressurized gas. The quick disconnect pneumatic connector 42 receives a mating pneumatic connector 54 disposed on the end of the torch cable. Connectors 42 and 54 may comprise respective parts of a ball locking-type coupling, in which case connector 42 comprises a sleeve 44 that is axially slidable between locking and releasing positions. Typically, the release movement is toward the panel 40, but the sleeve could also be a rotatable type to unlock the coupling. A lever or button could also be used to unlock the coupling. The coupling is preferably self-locking when the connector 54 is fully inserted into connector 42. The connector 42 further comprises a plurality of rolling elements 55 (two of which are indicated by dashed circles in FIG. 11). For example, the rolling elements may be balls or circular cylindrical rods. The rolling elements 55 seat in a circumferential raceway 56 formed on the outer periphery of the pneumatic connector 54. The pneumatic connector 54 is a hardened steel part. The interference of the rolling elements 55 latches the connector 54 inside the connector 42. At the same time, this latches the electrical plug to the electrical socket, as described below.

Figure 14:
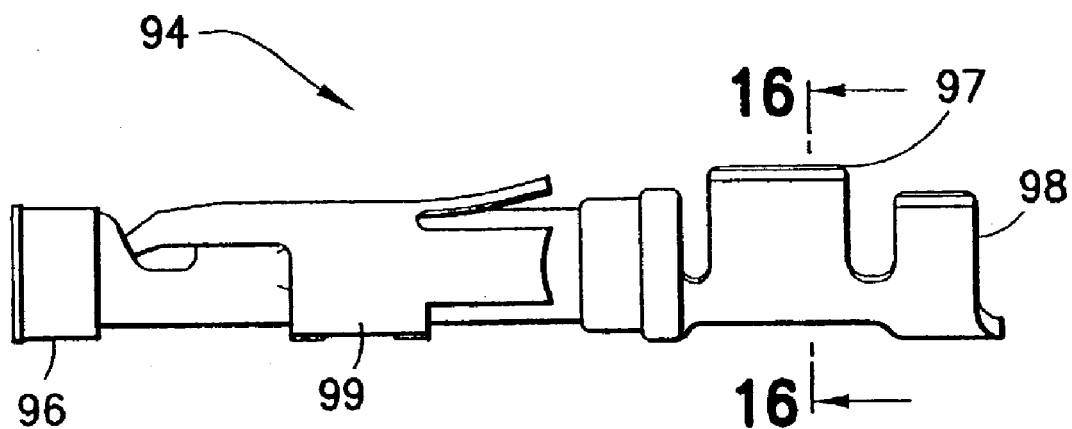
FIG. 14 is a drawing showing a side view of a socket assembly of the type used in the disclosed embodiments of the invention to provide electrical connections for power and control. This socket assembly is designed to receive and couple with the pin assembly depicted in FIG. 12.
Figure 15:
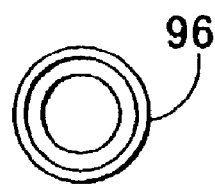
FIG. 15 is a drawing showing an end view of the socket assembly of FIG. 14. The end view of FIG. 15 is taken from a vantage point to the left of the socket assembly as seen in 14.
Figure 16:
FIG. 16 is a drawing showing a sectional view of a crimpable portion of the socket assembly of FIG. 14, the section being taken along line 16—16 indicated in FIG. 14.
Figure 18:
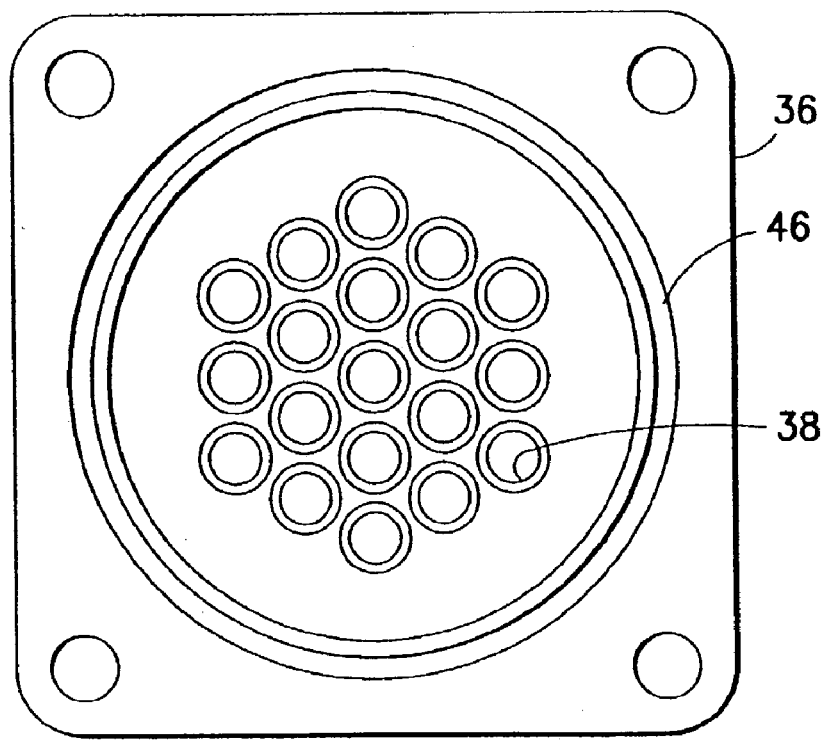
FIG. 18 is a drawing showing a front view of a flanged receptacle housing that is mounted to a panel on the supply unit for the same embodiment of the invention.

Referring again to FIGS. 4 and 5, an electrical socket is mounted to the panel 40, while an electrical plug is incorporated in the end of the torch cable. The electrical socket comprises an electrically insulative frame 46 having an array of mutually parallel cavities 38 (see FIG. 18), each cavity receiving a respective socket assembly 94 of the type shown in FIGS. 14–16. The frame 46 holds the socket assemblies in a mutually spaced apart and electrically isolated relationship. Each socket assembly 94 comprises a brass electrical connector and a stainless steel spring 99 that holds the brass connector inside a respective cavity of frame 46. One end of the brass electrical connector comprises a ferrule 96 that forms a socket (seen in FIG. 15), while the other end has a two pairs of crimpable wings 97 and 98 (wings 97 are seen in FIG. 16) which are crimped onto the uninsulated end of a respective one of a plurality of insulated wires 48. Some of wires 48 are coupled to the power circuit, while others are coupled to the controller. The frame 46 is fastened to the panel 40 (see FIG. 4) by means of a mounting flange 36 (see FIG. 18) that extends generally perpendicular to the axes of the cavities 38.

Figure 8:
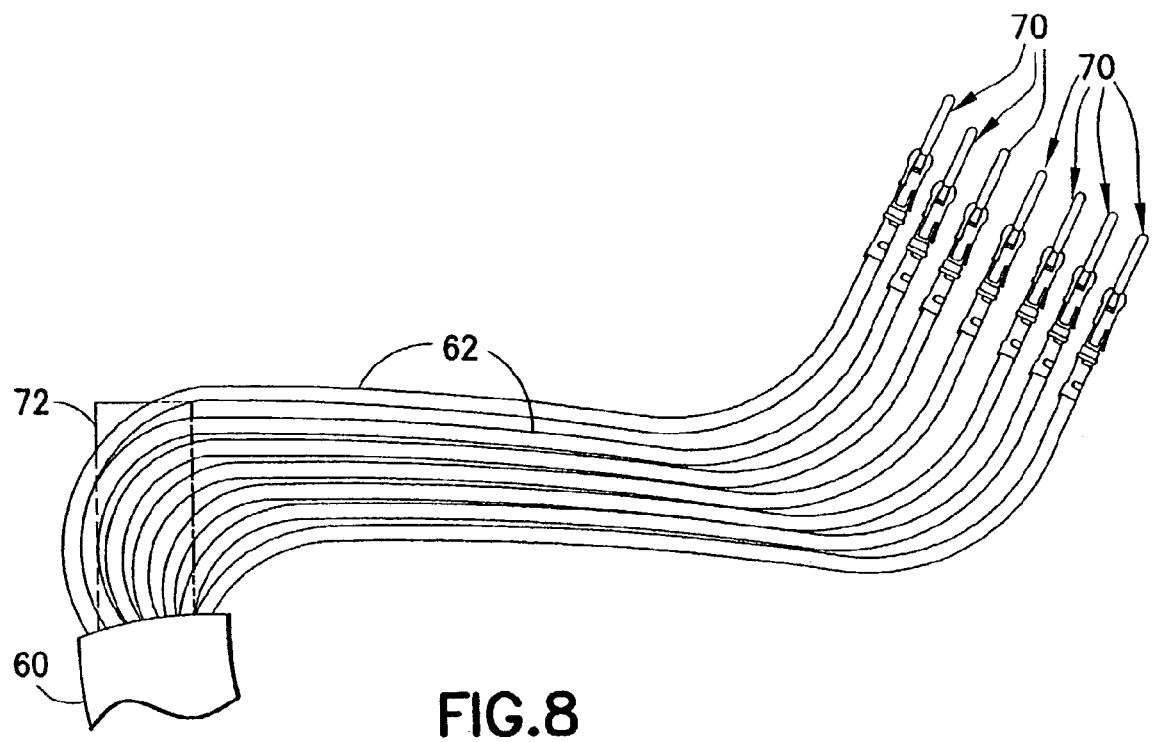
FIG. 8 is a drawing showing the ends of the air hose and sheath with a plurality of insulated wires exiting the annular space between the hose and sheath. In accordance with one method of manufacture, a fitting will be inserted in the end of the hose, the electrical connectors crimped onto the ends of the wires will be inserted in a plug, and the plug and fitting will be overmolded to form a body that holds the plug and fitting in place.
Figure 12:
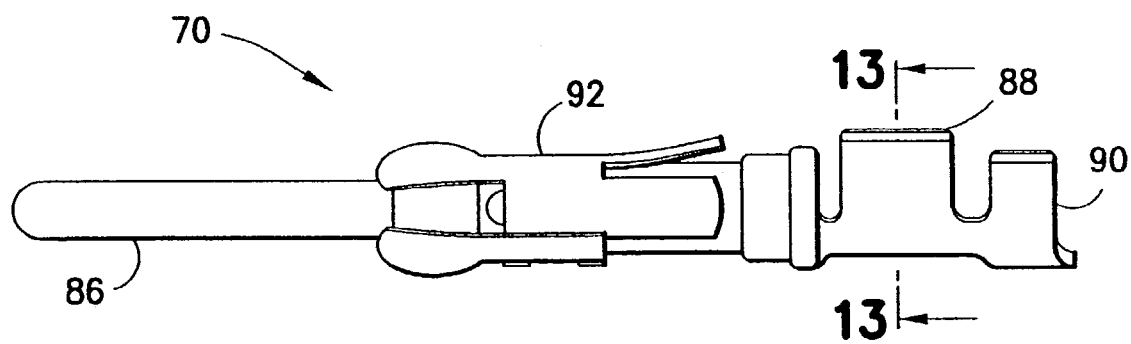
FIG. 12 is a drawing showing a side view of a pin assembly of the type used in the disclosed embodiments of the invention to provide electrical connections for power and control.
Figure 13:
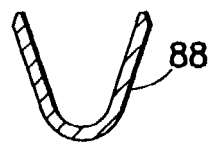
FIG. 13 is a drawing showing a sectional view of a crimpable portion of the pin assembly of FIG. 12, the section being taken along line 13—13 indicated in FIG. 12.
Figure 17:
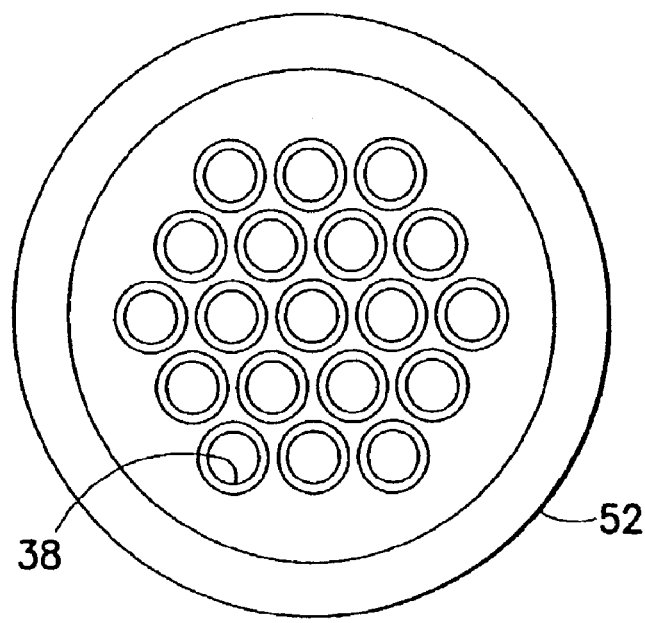
FIG. 17 is a drawing showing a front view of a plug incorporated in the torch cable end in accordance with one embodiment of the invention.

The electrical plug comprises an electrically insulative frame 52 having an array of mutually parallel cavities 38 (see FIG. 17), each cavity receiving a respective pin assembly 70 of the type shown in FIGS. 12 and 13. The plug frame 52 holds the pin assemblies in a mutually spaced apart and electrically isolated relationship. The pin assembly 70 comprises a brass electrical connector and a stainless steel spring 92 that holds the brass connector inside a respective cavity of frame 52. One end of the brass electrical connector comprises a pin 86 that is inserted in a socket of a mating socket assembly of the panel-mounted electrical socket, and two pairs of crimpable wings 88 and 90 (wings 88 are seen in FIG. 13) which are crimped onto the uninsulated end of a respective one of a plurality of insulated wires 62, as seen in FIG. 8. Some of wires 62 carry power to the torch, while other wires 62 transmit control signals, e.g., signals representing actuation of the torch trigger by the system operator.

Figure 4:
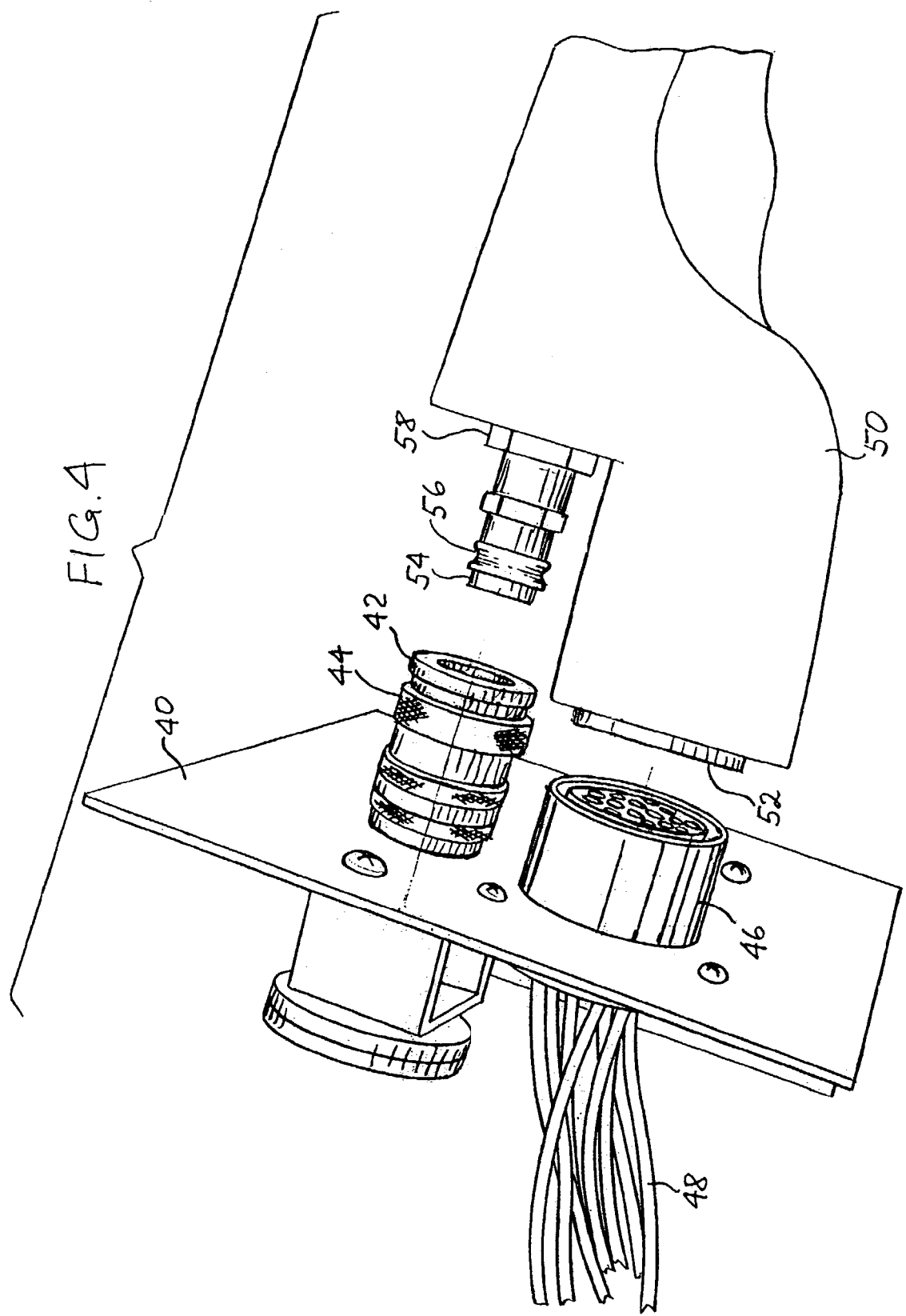
FIG. 4 is a drawing showing various components of a quick disconnect plasma torch system in accordance with one embodiment of the present invention. The cable of the plasma torch is shown in proximity to, but not yet coupled to, an electrical receptacle and a quick disconnect pneumatic connector located on a panel of the supply unit.
Figure 5:
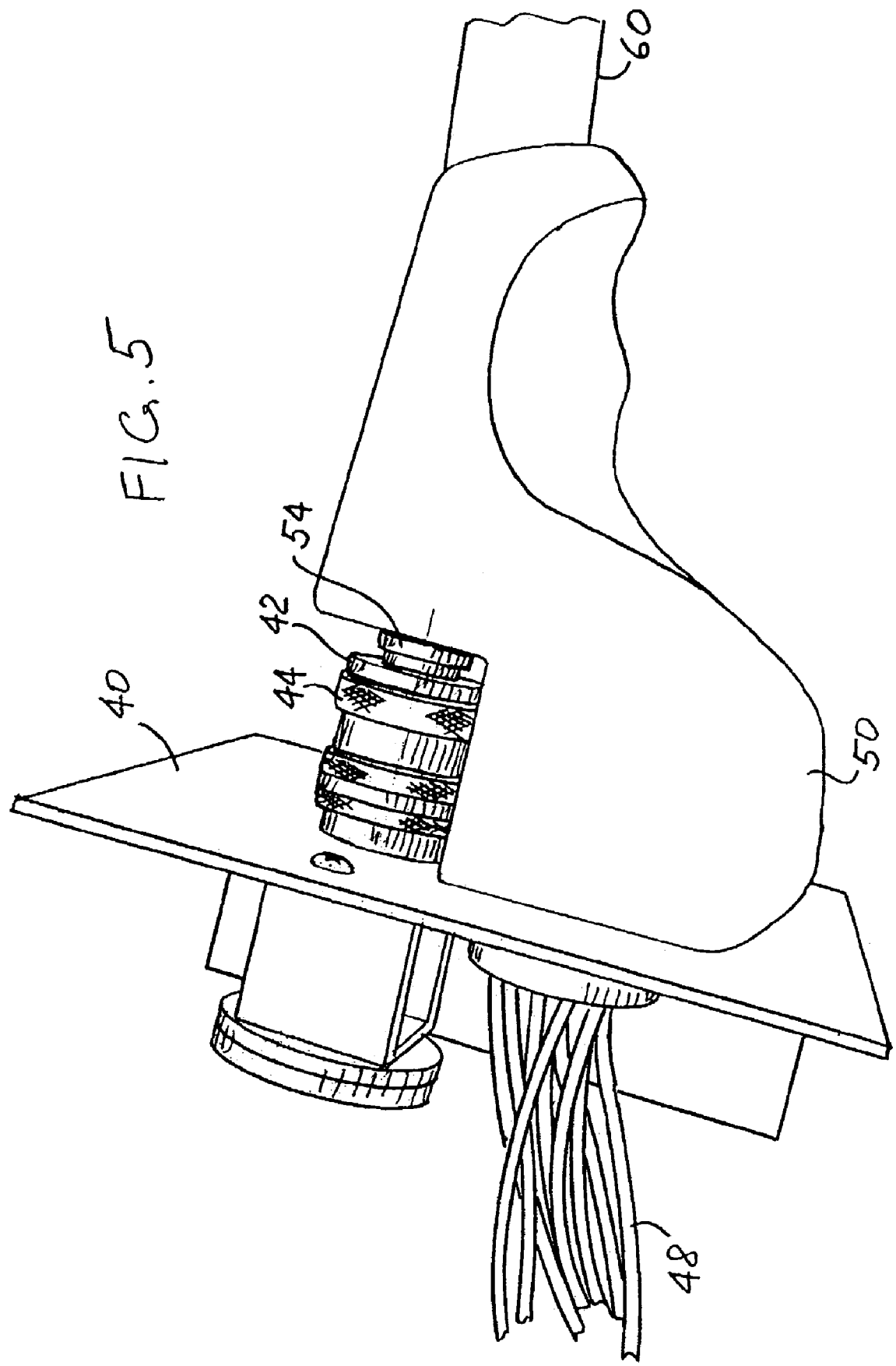
FIG. 5 is a drawing showing the components of FIG. 4 in a coupled state.

FIG. 4 shows the end of the torch cable in proximity to but not coupled to the panel of the supply unit. FIG. 5 shows the fully coupled state wherein both the pneumatic and electrical connections have been made by engaging the end of the torch cable with the receptacles 42 and 46 on the panel. The pneumatic connector 54 is fully inserted in the quick disconnect pneumatic connector 42, while the pins of the electrical plug are fully inserted into the respective sockets inside the cavities of the socket housing or frame 46. This can be accomplished with one motion of the torch cable end toward the panel. The cavities of plug frame 52 align with the cavities of socket frame 46 so that the pin assemblies of the former will be inserted into the socket assemblies of the latter when the plug is inserted into the socket with the correct orientation. The pneumatic connector 54 and the electrical plug form keying means by their orientation.

Figure 6:
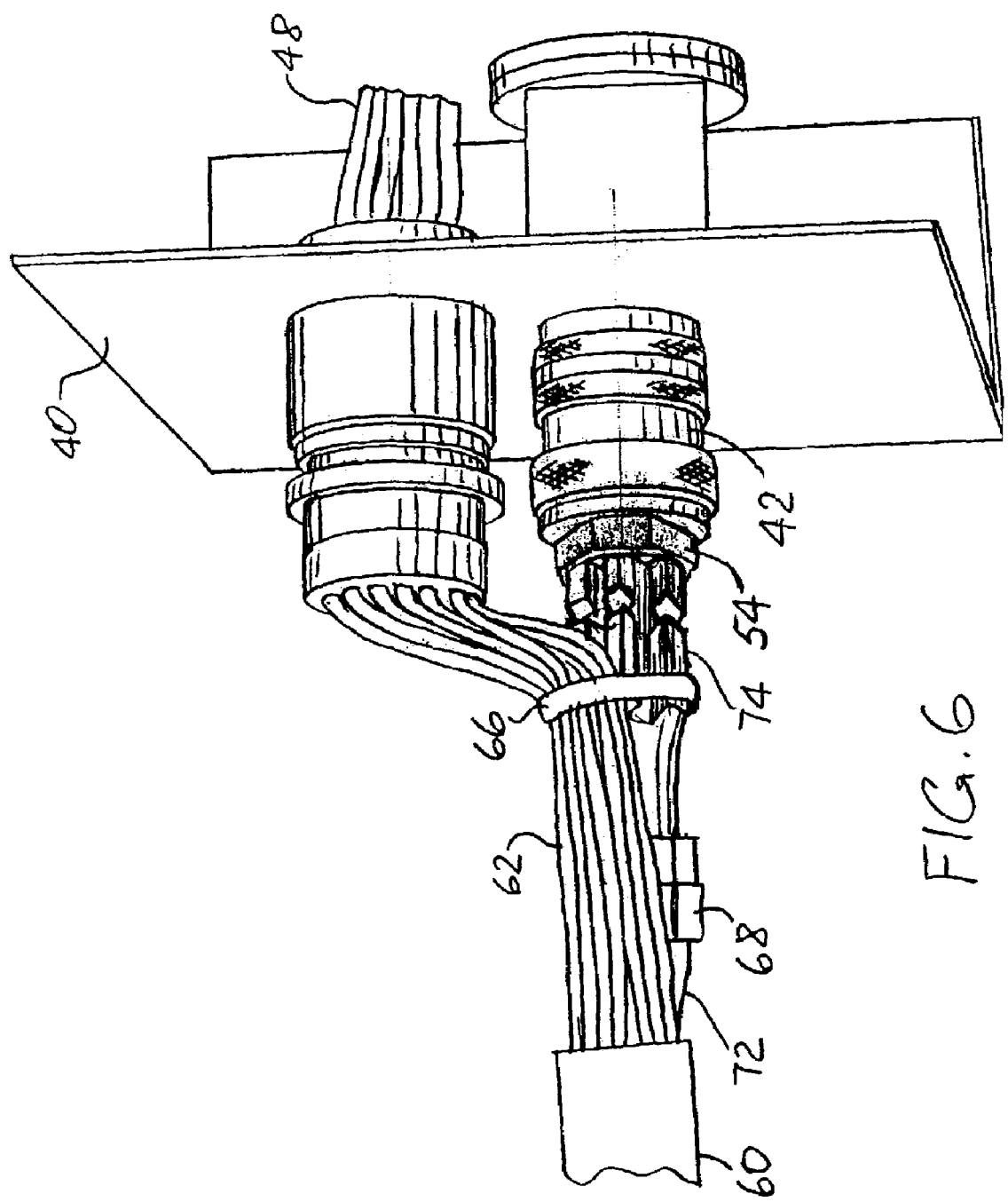
FIG. 6 is a drawing showing the components of FIG. 4 in a coupled state, but with the molded body on the end of the torch cable removed.
Figure 7:
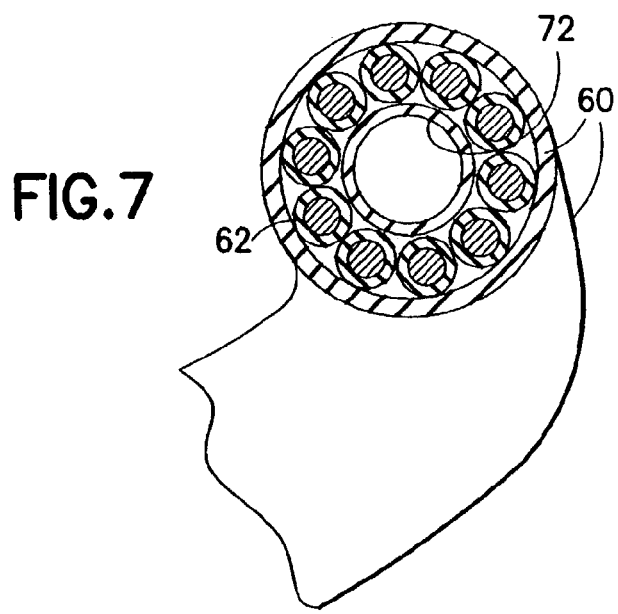
FIG. 7 is a drawing showing a sectional view of the torch cable partly shown in FIG. 6, the section being taken through the air hose and sheath.

As best seen in FIG. 4, the end of the torch cable comprises a molded body 50 of electrically insulative material. The molded body holds the pneumatic and electrical connectors of the torch cable end in a fixed spatial relationship. The electrical plug is embedded in the molded body, whereas the pneumatic connector 54 is not embedded in the molded body 50. FIG. 6 shows the end of the torch cable with the molded body removed for the purpose of revealing the structure that is embedded in the molded body. The molded body will reach and be joined to the end of a cable sheath 60 made of electrically insulating material. The sheath 60 surrounds a flexible hose 72, which protrudes out of the sheath by a certain distance, as best seen in FIG. 8. FIG. 7 shows the hose 72 arranged generally concentrically inside the sheath 60. The hose 72 carries pressurized gas from the quick disconnect gas coupling to the torch. The annular space between the hose and sheath is occupied by the insulated wires 62, which run the length of the torch cable. In one exemplary construction, there are seven power wires and three control wires, giving a total of ten, as seen in FIG. 7. FIG. 8 shows only six of the ten wires for the sake of economy and to avoid clutter in the drawing. However, the number of wires passing through the cable may be different than ten. Although not shown in FIG. 7, it is known to fill empty spaces between adjacent wires inside the sheath with a filler made, e.g., of rope to provide support.

Referring to FIG. 6, the pneumatic connector 54 is in fluid communication with the hose 72 via a metal (e.g., brass) fitting 74. The structure of the pneumatic connector 54 is shown in detail in FIG. 11, while the structure of the fitting 74 is shown in detail in FIGS. 9 and 10. The fitting 74 has a small-diameter end 80 and a large-diameter cup-shaped portion that starts from the opposite end. The small-diameter end is inserted inside the hose and is provided with wedge-shaped ridges on the outer periphery that facilitate insertion and resist removal. The hose is held on to the narrow end of the fitting 74 by a clamp 68 (more than one clamp can be used). The large-diameter end has a threaded bore into which a threaded end 57 of the pneumatic connector 54 (see FIG. 11) is screwed, thereby coupling the pneumatic connector 54 to the fitting 74. The connector 58 has a hexagonal flange 58 to facilitate tightening of the connector into the fitting using a tool. As best seen in FIG. 10, the fitting has a passageway 82 in the small-diameter section, which will be in fluid communication with the hose and the passageway of the pneumatic connector 54 when the latter is screwed into the large-diameter threaded bore 84 of the fitting.

Figure 11:
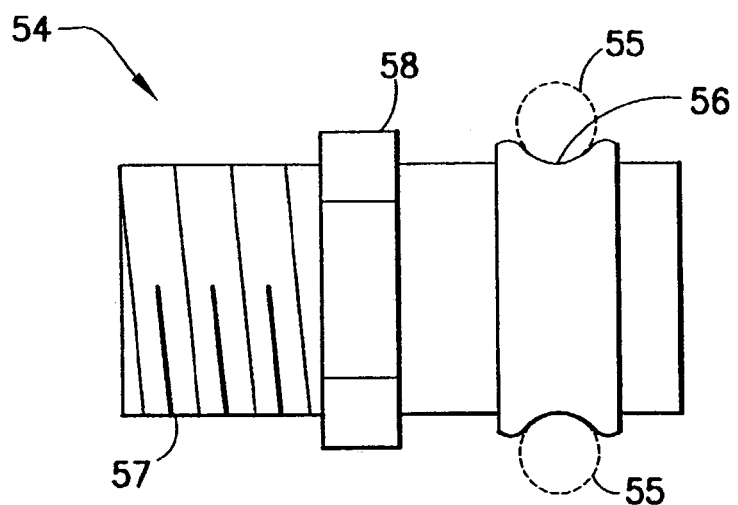
FIG. 11 is a drawing showing a side view of a pneumatic connector that is coupled to the torch cable fitting and forms part of the quick disconnect coupling. A pair of rolling elements (e.g., balls or rods) incorporated in the quick disconnect pneumatic connector on the supply unit are indicated by dashed lines.

Only the hexagonal flange of the pneumatic connector 54 is visible in FIG. 6 because the threaded end 57 is inserted inside the fitting 74, while the section on the other side of the hexagonal flange that carries the raceway 56 is inserted inside the quick disconnect pneumatic connector 42, where it is engaged by the plurality of rolling elements 55 (only two of which are depicted in FIG. 11). The interference of the rolling elements 55 with the raceway 56 latches both the pneumatic and electrical connections together. Both can be disconnected by the simple expedient of sliding the sleeve 44 (see FIG. 4) toward the panel 40 and then pulling the pneumatic and electrical coupling elements incorporated on the end of the torch out of the pneumatic and electrical coupling elements mounted to the panel.

Referring again to FIG. 6, the fitting 74, the electrical plug and insulated wires connected thereto, the end of the hose 72, the clamp 68 and a nylon cable tie 66 (the cable tie is optional) will be placed in a mold that holds the plug and fitting in a predetermined spatial relationship to each other and to the hose. These parts of the assembly are then overmolded to form the molded body 50 seen in FIGS. 4 and 5. One suitable material for forming the molded body is a urethane rubber compound, but other materials having similar properties can be used. After the material of the molded body has cured, the pneumatic connector 54 (see FIG. 11) is screwed into the large-diameter end of the fitting 74, which is exposed and not enclosed by the molded body. Similarly, the front face of the electrical plug, with a plurality of pins protruding therefrom is exposed and not covered by the molded body, so that the plug can be coupled to the socket on the panel of the supply unit.

Figure 9:
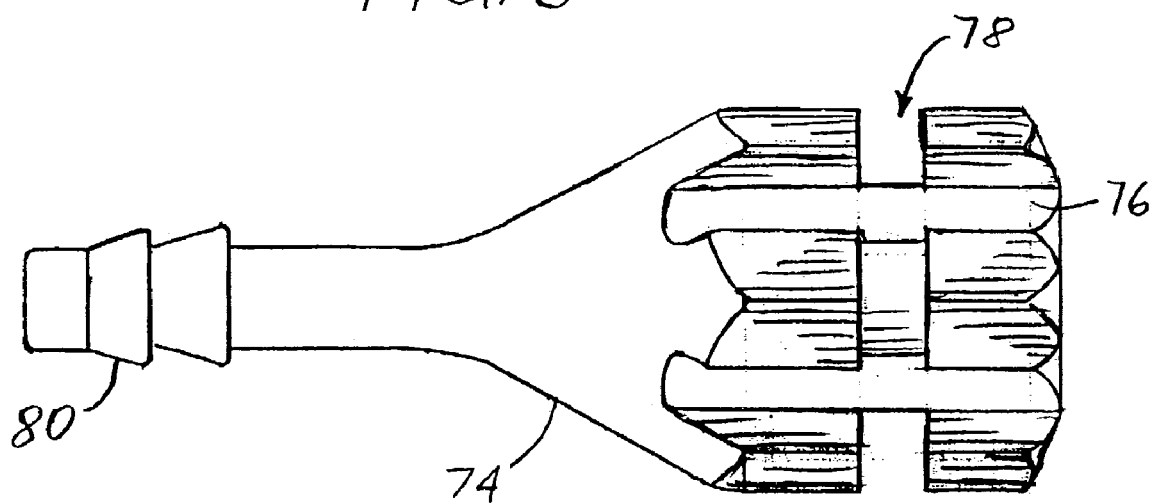
FIGS. 9 and 10 are drawings showing side and end views respectively of the fitting that is inserted into the air hose and is later coupled to a pneumatic connector. The end view of FIG. 10 is taken from a vantage point to the right of the fitting as seen in FIG. 9.
Figure 10:
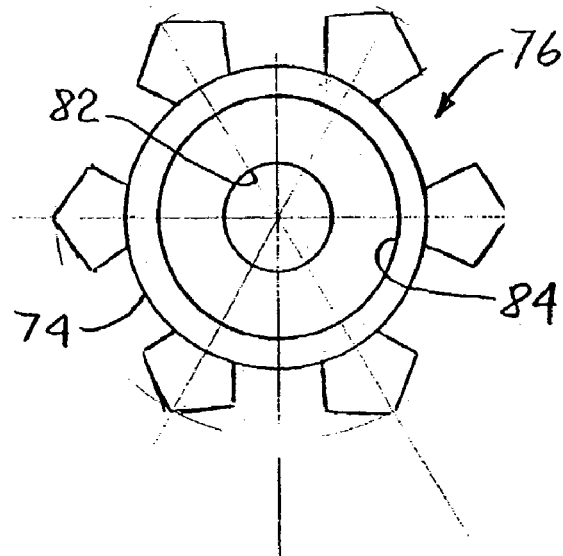

As seen in FIG. 9, the fitting 74 may be provided with one or more recesses that are filled with the material of the molded body so that the fitting is restrained from displacing or rotating relative to the molded body. The recesses may take the form of a plurality of axial grooves circumferentially distributed at angular intervals on the periphery of the fitting, which prevent rotation of the fitting relative to the molded body when filled with material during overmolding. Additional recesses 78 may be provided to prevent axial displacement of the fitting relative to the molded body when filled with material during overmolding.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. For example, instead of placing the electrical plug on the end of the torch lead and the electrical socket on the power supply unit, the electrical socket could be placed on the end of the torch lead while the electrical plug is mounted to the power supply unit. In addition, the fitting and quick disconnect connector could be formed as a monolithic structure. Therefore it is intended that the invention not be limited to the particular embodiment disclosed as the best mode contemplated for carrying out this invention, but that the invention will include all embodiments falling within the scope of the appended claims.

As used in the claims, the term "torch" is defined broadly to encompass plasma arc cutting torches as well as arc welding torches or guns.

What is claimed is:

1. A torch assembly comprising a torch cable and a torch coupled to one end of said torch cable, said torch comprising an electrode, and said torch cable comprising:
   a fitting having a passageway;
   a hose having a passageway for guiding gas from said passageway of said fitting to said torch;
   a plurality of insulated wires adjacent and external to said hose, at least some of said wires being electrically coupled to said electrode of said torch;
   a plurality of electrical connectors respectively electrically coupled to said wires;
   an electrically insulative support structure that supports said plurality of electrical connectors in a spaced and individually electrically isolated relationship;
   a sheath surrounding said hose along at least a portion of the hose's length, said insulated wires passing between said hose and said sheath; and
   an electrically insulative body proximal to the other end of said torch cable, said body holding said support structure and said fitting in a fixed spatial relationship,
   wherein said body is a molded mass of electrically insulative material in which respective portions of said support structure and said fitting are embedded, and said fitting has one or more recesses that are filled with material of said molded body in a manner such that said fitting is restrained by said molded body from moving relative to said molded body.

2. The torch assembly as recited in claim 1, further comprising a connector having a passageway, one end of said connector being coupled to one end of said fitting, said passageway of said connector being in fluid communication with said passageway of said hose via said passageway of said fitting.

3. The torch assembly as recited in claim 1, wherein said fitting has one or more recesses that are filled with material of said molded body in a manner such that rotation of said fitting about its own axis is restrained by said molded body.

4. The torch assembly as recited in claim 3, wherein said recesses comprise a plurality of axial grooves circumferentially distributed at angular intervals in said fitting.

5. The torch assembly as recited in claim 1, wherein said fitting has one or more recesses that are filled with material of said molded body in a manner such that displacement of said fitting along its own axis is restrained by said molded body.

6. The torch assembly as recited in claim 2, wherein one end of said fitting resides inside an end of said hose, while said other end of said connector is inserted inside the other end of said fitting.

7. The torch assembly as recited in claim 6, wherein said other end of said connector is threadably coupled to said other end of said fitting.

8. The torch assembly as recited in claim 1, wherein each of said electrical connectors comprises a respective pin having a free end and a respective element that is crimped onto the end of an uninsulated end of a respective one of said insulated wires, said free ends of said pins being generally parallel to each other and to an axis of said fitting.

9. The torch assembly as recited in claim 1, wherein each of said electrical connectors comprises a respective socket having an axis and a respective element that is crimped onto the end of an uninsulated end of a respective one of said insulated wires, said axes of said sockets being generally parallel to each other and to an axis of said fitting.

10. The torch assembly as recited in claim 2, wherein said connector has a circumferential raceway on its outer periphery.

11. The torch assembly as recited in claim 1, wherein said torch comprises a control device that changes state when operated by the torch user, at least one of said wires carrying a control signal produced as the result of said control device being operated.

12. A system for coupling one end of a torch cable to a supply unit that supplies both power and pressurized gas, said torch cable in turn carrying power and pressurized gas from the supply unit to a torch coupled to the other end of said torch cable, wherein said one end of said torch cable comprises first pneumatic connection means and first electrical connection means, while said supply unit comprises second pneumatic connection means designed to couple with said first pneumatic connection means, second electrical connection means designed to couple with said first electrical connection means, and a panel to which said second pneumatic connection means and said second electrical connection means are mounted, wherein one of said first and second pneumatic connection means comprise a circumferential raceway on its outer periphery, and said system comprises quick disconnect latching means for latching said first and second pneumatic connection means to each other, said quick disconnect latching means comprising a sleeve that is axially displaceable along the other of said first and second pneumatic connection means, and a plurality of rolling elements that lock said one of said first and second pneumatic connection means inside said other of said first and second pneumatic connection means when said sleeve is in a locking axial position, said rolling elements being displaceable out of said raceway to release said one of said first and second pneumatic connection means when said sleeve is moved from said locking axial position to an unlocking axial position.

13. The system as recited in claim 12, wherein said torch cable further comprises a hose for passing gas from said first pneumatic connection means to said torch; and said first pneumatic connection means comprise a fitting having one end connected to said hose and a connector coupled to the other end of said fitting, a free end of said connector being mated with said second pneumatic connection means.

14. The system as recited in claim 13, wherein said torch further comprises an electrode, and said torch cable further comprises a plurality of insulated wires adjacent and external to said hose, at least some of said wires connecting said electrode to said first electrical connection means, and an electrically insulative sheath surrounding said hose along at least a portion of the hose's length, said insulated wires passing between said hose and said sheath.

15. The system as recited in claim 14, wherein said supply unit comprises a power circuit, a controller and a plurality of uninsulated wires, some of said wires being electrically coupled to said controller, and others being electrically coupled to said power circuit; said first electrical connection means comprise a first plurality of electrical connectors respectively electrically coupled to said wires; and a first electrically insulative support structure that supports said first plurality of electrical connectors in a spaced and individually electrically isolated relationship; and said second electrical connection means comprise a second plurality of electrical connectors respectively electrically coupled to said insulated wires in said supply unit; and a second electrically insulative support structure that supports said second plurality of electrical connectors in a spaced and individually electrically isolated relationship.

16. The system as recited in claim 15, wherein each of said electrical connectors of said first plurality comprises a respective pin having a free end and a respective element that is crimped onto the end of an uninsulated end of a respective one of said insulated wires in said torch cable, and each of said electrical connectors of said second plurality comprises a respective socket and a respective element that is crimped onto the end of an uninsulated end of a respective one of said insulated wires in said supply unit, said pins fitting inside said sockets in a one-to-one relationship.

17. The system as recited in claim 15, wherein each of said electrical connectors of said first plurality comprises a respective socket and a respective element that is crimped onto the end of an uninsulated end of a respective one of said insulated wires in said torch cable, and each of said electrical connectors of said second plurality comprises a respective pin having a free end and a respective element that is crimped onto the end of an uninsulated end of a respective one of said insulated wires in said supply unit, said pins fitting inside said sockets in a one-to-one relationship.

18. The system as recited in claim 13, wherein said one end of said torch cable further comprises a molded body of electrically insulative material in which respective portions of said first pneumatic connection means and said first electrical connection means are embedded and held in a fixed spatial relationship with mutually parallel axes, said parallelism allowing said first pneumatic connection means and said first electrical connection means to be respectively coupled to said second pneumatic connection means and said second electrical connection means during the same movement of said molded body toward said panel.

19. The system as recited in claim 18, wherein said fitting has one or more recesses that are filled with material of said molded body in a manner such that rotation of said fitting about its own axis is restrained by said molded body.

20. The system as recited in claim 19, wherein said recesses comprise a plurality of axial grooves circumferentially distributed at angular intervals in said fitting.

21. The system as recited in claim 18, wherein said fitting has one or more recesses that are filled with material of said molded body in a manner such that displacement of said fitting along its own axis is restrained by said molded body.

22. The system as recited in claim 12, wherein said torch comprises a control device that changes state when operated by the torch user, at least one of said wires in said torch cable carrying a control signal produced as the result of said control device being operated.

23. A system for coupling one end of a torch cable to a supply unit that supplies both power and pressurized gas, said torch cable in turn carrying power and pressurized gas from the supply unit to a torch coupled to the other end of said torch cable, wherein said one end of said torch cable comprises a body of electrically insulative material, a fitting having a passageway and an outer periphery surrounded by a first portion of said body, a first coupling element having one end coupled to said fitting and having a passageway in fluid communication with said passageway of said fitting, and an electrical plug having an outer periphery surrounded by a second portion of said body, while said supply unit comprises a panel, a second coupling element mounted to said panel that couples with said first coupling element, and an electrical socket mounted to said panel that receives said electrical plug, wherein said body supports said fitting and said electrical plug in a fixed spatial relationship that allows said first and second coupled elements to be coupled to each other and said electrical plug to be plugged into said electrical socket during the same movement of said body toward said panel, wherein said first and second coupling elements form a quick disconnect coupling, one of said first and second coupling elements comprising a circumferential raceway on its outer periphery, and the other of said first and second coupling elements comprising a sleeve that is axially displaceable and a plurality of rolling elements that lock said one of said first and second coupling elements inside said other of said first and second coupling elements when said sleeve is in a locking axial position, said rolling elements being displaceable out of said raceway to release said one of said first and second coupling elements when said sleeve is moved from said locking axial position to an unlocking axial position.

24. The system as recited in claim 23, wherein said torch cable further comprises a hose for passing gas from said fitting to said torch.

25. The system as recited in claim 24, wherein said torch further comprises an electrode, and said torch cable further comprises a plurality of insulated wires adjacent and external to said hose, at least some of said wires connecting said electrode to said electrical plug, and an electrically insulative sheath surrounding said hose along at least a portion of the hose's length, said insulated wires passing between said hose and said sheath.

26. A system for coupling one end of a torch cable to a supply unit that supplies both power and pressurized gas, said torch cable in turn carrying power and pressurized gas from the supply unit to a torch coupled to the other end of said torch cable, wherein said one end of said torch cable comprises a body of electrically insulative material, a fitting having a passageway and an outer periphery surrounded by a first portion of said body, a first coupling element having one end coupled to said fitting and having a passageway in fluid communication with said passageway of said fitting, and an electrical socket having an outer periphery surrounded by a second portion of said body, while said supply unit comprises a panel, a second coupling element mounted to said panel that couples with said first coupling element, and an electrical plug mounted to said panel that is received by said electrical socket, wherein said body supports said fitting and said electrical plug in a fixed spatial relationship that allows said first and second coupled elements to be coupled to each other and said electrical plug to be plugged into said electrical socket during the same movement of said body toward said panel, wherein said first and second coupling elements form a quick disconnect coupling, one of said first and second coupling elements comprising a circumferential raceway on its outer periphery, and the other of said first and second coupling elements comprising a sleeve that is axially displaceable and a plurality of rolling elements that lock said one of said first and second coupling elements inside said other of said first and second coupling elements when said sleeve is in a locking axial position, said rolling elements being displaceable out of said raceway to release said one of said first and second coupling elements when said sleeve is moved from said locking axial position to an unlocking axial position.

27. A method of quickly connecting the power and gas lines of a torch to a supply unit, comprising the following steps:
   manufacturing a torch cable in which the power and gas lines are inside a sheath, and a first power coupling element connected to the power line and a first gas coupling element connected to the gas line are spaced apart from each other and have parallel axes;
   manufacturing a panel of said supply unit so that a second power coupling element in electrical communication with a power supply and a second gas coupling element in fluid communication with a gas supply are spaced apart from each other and have parallel axes;
   engaging said first power coupling element with said second power coupling element and said first gas coupling element with said second gas coupling element by a single continuous movement of said end of said torch cable toward said panel; and latching said first and second gas coupling elements together while fully engaged, wherein latching is the result of a plurality of rolling elements mounted to one of said first and second gas coupling elements engaging a circumferential raceway on the outer periphery of the other of said first and second gas coupling elements when a sleeve is displaced axially along one of said first and second gas coupling elements.

28. A system comprising:
   a torch cable comprising power and gas lines, a sheath surrounding respective portions of said power and gas lines, a first power coupling element connected to said power line, a first gas coupling element connected to said gas line, and means for supporting said first power coupling element and said first gas coupling element in a fixed spatial relationship spaced apart from each other;
   a supply unit comprising a panel, a second power coupling element in electrical communication with a power supply and mounted to said panel, and a second gas coupling element in fluid communication with a gas supply, said second power coupling element and said second gas coupling element being in a fixed spatial relationship spaced apart from each other; and
   means for latching said first and second gas coupling elements together,
   wherein said first and second power coupling elements and said first and second gas coupling elements are arranged so that said first power coupling element can be engaged with said second power coupling element and said first gas coupling element can be engaged with said second coupling element by a single continuous movement of said end of said torch cable toward said panel, and
   wherein said latching means comprise a plurality of rolling elements mounted to one of said first and second gas coupling elements, a circumferential raceway on the outer periphery of the other of said first and second gas coupling elements, and a sleeve that is axially displaceable along one of said first and second gas coupling elements.

29. The system as recited in claim 28, wherein said gas line comprises an air hose and a fitting in fluid communication with said air hose, said supporting means comprises a molded body of electrically insulative material, said first power coupling element and said fitting being embedded in and restrained from relative movement by said molded body, and said first gas coupling element is coupled to said fitting.

30. The system as recited in claim 28, wherein said first power coupling element comprises an electrical plug and said second power coupling element comprises an electrical socket.

31. The system as recited in claim 28, wherein said first power coupling element comprises an electrical socket and said second power coupling element comprises an electrical plug.

* * * * *